(12) United States Patent
Bhide et al.

(10) Patent No.: US 7,865,489 B2
(45) Date of Patent: Jan. 4, 2011

(54) SYSTEM AND COMPUTER PROGRAM PRODUCT FOR DISCOVERING DESIGN DOCUMENTS

(75) Inventors: Manish Anand Bhide, New Delhi (IN); Mukesh Kumar Mohania, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 11/946,495

(22) Filed: Nov. 28, 2007

(65) Prior Publication Data

US 2009/0138462 A1    May 28, 2009

(51) Int. Cl.
   *G06F 17/30* (2006.01)
(52) U.S. Cl. ............... 707/705; 707/706; 707/707; 707/708; 707/760; 707/773; 707/803; 707/806
(58) Field of Classification Search .......... 707/100, 707/999.1, 705, 706, 707, 708, 760, 773, 707/803, 806, 1, 3, 999.001, 999.003
See application file for complete search history.

(56) References Cited

U.S. PATENT DOCUMENTS

| | | | |
|---|---|---|---|
| 6,546,381 B1 | 4/2003 | Subramanian et al. | |
| 6,604,099 B1 * | 8/2003 | Chung et al. ................. | 1/1 |
| 6,721,724 B1 | 4/2004 | Galindo-Legaria et al. | |
| 6,826,568 B2 * | 11/2004 | Bernstein et al. ............ | 1/1 |
| 6,963,880 B1 | 11/2005 | Pingte et al. | |
| 6,986,104 B2 * | 1/2006 | Green et al. ................. | 715/234 |
| 7,225,199 B1 * | 5/2007 | Green et al. ................. | 1/1 |
| 7,251,777 B1 * | 7/2007 | Valtchev et al. ............. | 715/234 |
| 7,337,182 B2 | 2/2008 | Rothschiller et al. | |
| 7,720,873 B2 * | 5/2010 | Loving et al. ............... | 707/802 |
| 2002/0040359 A1 * | 4/2002 | Green et al. .................. | 707/3 |
| 2003/0225747 A1 * | 12/2003 | Brown et al. .................. | 707/3 |
| 2004/0028049 A1 * | 2/2004 | Wan ............................ | 370/394 |
| 2004/0194016 A1 * | 9/2004 | Liggitt ....................... | 715/501.1 |
| 2005/0144556 A1 * | 6/2005 | Petersen et al. ............. | 715/513 |
| 2005/0149911 A1 * | 7/2005 | Nadon et al. ................ | 717/120 |
| 2005/0229097 A1 * | 10/2005 | Lander ........................ | 715/517 |
| 2005/0288920 A1 * | 12/2005 | Green et al. .................. | 704/3 |
| 2006/0059180 A1 * | 3/2006 | Wen et al. .................... | 707/100 |
| 2006/0173865 A1 * | 8/2006 | Fong ........................... | 707/100 |
| 2006/0218163 A1 * | 9/2006 | Marcjan et al. .............. | 707/100 |
| 2006/0253476 A1 * | 11/2006 | Roth et al. .................... | 707/100 |
| 2007/0055655 A1 * | 3/2007 | Bernstein et al. ............. | 707/3 |
| 2007/0185868 A1 * | 8/2007 | Roth et al. .................... | 707/6 |
| 2008/0016502 A1 * | 1/2008 | Henderson et al. .......... | 717/143 |
| 2008/0133553 A1 * | 6/2008 | Kitsis et al. ................. | 707/100 |
| 2008/0313234 A1 * | 12/2008 | Chen et al. ................. | 707/104.1 |
| 2009/0100022 A1 * | 4/2009 | Nayak et al. ................. | 707/3 |

* cited by examiner

*Primary Examiner*—Don Wong
*Assistant Examiner*—Thanh-Ha Dang
(74) *Attorney, Agent, or Firm*—Ryan, Mason & Lewis, LLP

(57) ABSTRACT

Techniques for obtaining a lineage of a schema in one or more documents are provided. The techniques include using a schema to find a document that is most relevant to the schema, obtaining one or more relevant portions of the most relevant document that is related to the schema, constructing a first probe set from the one or more relevant portions of the document, using the first probe set to discover one or more documents for obtaining lineage information, discovering a second probe set from the one or more documents, and recursively using the second probe set to discover a related document.

8 Claims, 2 Drawing Sheets

SYSTEM AND COMPUTER PROGRAM PRODUCT FOR DISCOVERING DESIGN DOCUMENTS

CROSS-REFERENCE TO RELATED APPLICATION(S)

The present application is related to commonly assigned U.S. application Ser. No. 11/946,414 entitled "Method for Discovering Design Documents," and filed on even date herewith, the disclosure of which is incorporated by reference herein in its entirety.

FIELD OF THE INVENTION

The present invention generally relates to information technology, and, more particularly, to information integration.

BACKGROUND OF THE INVENTION

Information integration is a challenging area in information technology. A problem while integrating different schemas is the lack of information about the schemas. Schemas of tables and databases used in applications and/or products can change significantly over a period of time. Product architects often change, and the continuity in schema design is often lost due to such changes.

Schema information is generally documented in design documents which are lost in the maze of documents generated over a period of time. For example, schema information can include multiple design documents per release (one for each phase of development cycle), and multiple types of design document for each cycle. As a result, there is a need for a tool that automatically discovers all relevant design documents and presents the lineage information of a schema to a data administrator.

Finding the correct lineage is difficult because a database schema undergoes significant changes over time. For example, very little similarity exists between the existing schema and the older schemas, as the names of product/component also change over time. For instance, finding a document PES SDD VlR2 (Policy Editor Storage) is a follow up of SM SDD V1R1 (Storage Manager), and is non-trivial. Performing this task manually by reading each document is tedious and disadvantageous.

Finding the correct lineage is also difficult because each component and/or product has hundreds of tables. Each schema can be documented in a different design document of a different release/version. For example, POLICY_STORE can be documented in PES_SDDV2R3, whereas NOTIFICATION_STORE can be documented in AM_SDDV1R2. Also, a person integrating two different schemas cannot be expected to know the location of design information for each of the potentially hundreds of tables.

A simple search of each column and table name in the design document is not enough to find the relevant information, as the name of the table and column name can be written in different ways in the design document. For example, consider a column entitled: Social_Security_Code or S_S_Code. In the design document, the following paragraph may be present for the column:

Social Security Code:
Field is fixed, 1 byte field.
Values are:
  1=Domestic TIN
  2=SSN
  3=Foreign Business ID
  4=NRA
  5=Awaiting TIN
Utilize, if needed, to facilitate handling of SSN field.

Consequently, there is a need for a tool that is able to handle changes in a name of the column which could include, for example, addition of spaces, change in spelling, etc. Existing approaches include, for example, a regular text search will not work effectively as schema name and format changes significantly over time.

SUMMARY OF THE INVENTION

Principles of the present invention provide techniques for discovering design documents. An exemplary method (which may be computer-implemented) for obtaining a lineage of a schema in one or more documents, according to a first aspect of the invention, can include steps of using a schema to find a document that is most relevant to the schema, obtaining one or more relevant portions of the most relevant document that is related to the schema, constructing a first probe set from the one or more relevant portions of the document, using the first probe set to discover one or more documents for obtaining lineage information, discovering a second probe set from the one or more documents, and recursively using the second probe set to discover a related document.

At least one embodiment of the invention can be implemented in the form of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
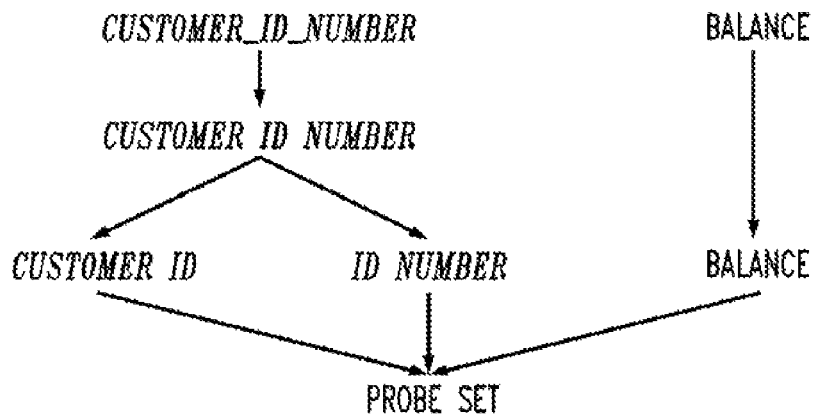
FIG. 1 is a diagram illustrating an initial probe set construction, according to an embodiment of the present invention.

Principles of the present invention include discovering design documents for information integration. One or more embodiments of the invention include finding lineage of relational schema present in documents, as well as finding relevant portions of documents that are related to a schema.

One or more embodiments of the invention include using recursive construction of a probe set, as well as discovering column names that have been changed due to use of surrounding context information and discovering modified column names due to use of bi-grams and unigrams.

Principles of the present invention also include discovering the evolution of design documents that are advantageous for information integration. One or more embodiments of the invention enable a user to have a pictorial representation of the evolution of the schema of a table and/or database. Such a representation can include information such as, for example, what column was added and when it was added, when a column was removed, when the name of a column was changed, when the format was changed, etc. This, as a result, provides complete lineage information of database schema entities.

For example, consider a data architect who is performing schema mapping of two data sources. The data architect has to manually explore both schemas to understand the semantic information present in the various columns. In order to take any action, the data architect needs to understand the reason for creating a particular column. This can be difficult in practice for, as an example, a primary key column that is machine-generated and exists and has no real life significance. For that, the data architect needs to look at the design document in which the column was introduced. One or more embodiments of the invention present lineage information, the use of which enables the data architect to narrow in on a specific design document as well as a specific part of the design document where a particular column was first introduced.

Examples of two columns from a data warehouse of a bank include the following. The primary key of the data warehouse could be machine-generated. Hence, a user trying to understand the schema by looking at the data will not be able to understand the physical significance of the primary key of the data warehouse. Also, looking at the lineage can help the data designer to weed out columns that are no longer needed. For example, assume "Access flag" was added to a schema to check the locking status of column "Carry forward balance" and "Carry forward debit" Later, say in one version, "Carry forward balance" was removed as a column. As "Carry forward debit" is still present, the "Access flag" is still present in the schema. Later, the data architect changed and the new architect removed the column "Carry forward balance" as well. The new architect might overlook the fact that the "Access flag" is no longer needed and this will add an overhead to the system. With the lineage information, such unnecessary information can be pinpointed and weeded out.

One or more embodiments of the present invention include a recursive discovery process. A relational schema may be used to construct a set of keywords to be used to find the document that is most similar to the relational schema. This set of keywords constructed from the relational schema is referred to as the probe set. Also, to find the document that is most similar to the relational schema, each document can be converted into a set of keywords. Based on the similarity of the keywords present in the document to the keywords present in the probe set, the document that is most similar to the relational schema can be found.

Once a document (for example, D1) has been found that is most similar to the relational schema, the region within the document that has information about the schema is found. From this region, a new probe set can be constructed. The new probe set can be used to find a document (for example, D2) using the same techniques as were used to find D1 above. Additionally, a document that is most similar to D2 can be constructed in a similar manner. Consequently, the entire lineage information for a relational schema can be obtained.

As noted above, a relational schema is initially analyzed to identify a set of keywords that can be used to find the most relevant set of design documents. This initial set of keywords is referred to herein as the probe set. FIG. 1 is a diagram illustrating an initial probe set construction, according to an embodiment of the present invention. FIG. 1 depicts a schema including two column names, Customer_ID_Number and Balance. It should be appreciated by a person skilled in the art that there could be additional columns, tables, names and databases in the schema. Such exemplary additions can also be used to construct the probe set. FIG. 1 illustrates how some keywords (which in FIG. 1 are column names) and construct the initial probe set can be split.

As illustrated in FIG. 1, construction of an initial probe set includes tokenizing schema on spaces and special characters such as, for example, "_", "-", "." etc. Also, extra information such as, for example, an enterprise glossary, can be tokenized if it is relevant to schema. Bi-grams and unigrams can be constructed from tokens and added to the probe set. Bi-grams are groups of two words that appear consecutively after tokenizing schema elements. For example, after a user tokenizes the column name Customer_ID_Number, the column name is converted to Customer_ID Number. The bi-grams of this would be "Customer ID" and "ID Number." A unigram includes a single word. Hence, the unigram representation of Customer_ID_Number would be "Customer," "ID" and "Number."

Construction of an initial probe set may also include a probe set for each table. Tf-idf weights can be determined for all the terms in a probe set with respect to each table. Tf stands for term frequency of a term "k" in a table "t." The term frequency measures the number of times that the term appears in the bi-grams and unigrams constructed from the table keywords. This can be normalized by the total number of bi-grams and unigrams. For example, if a term "Customer" appears four times amongst all of the unigrams and bi-grams constructed for a table "Customer_Table" and the total number of unigrams and bi-grams constructed from the table are 20, then the term frequency of term "Customer" is "Customer_Table" is 0.2 (that is, four divided by twenty). The "idf" stands for the inverse document frequency. The idf of a term "k" is given by the following equation:

$$\mathrm{idf}(k)=\mathrm{Log}(\text{Total number of tables in the relational schema/Number of tables in which keyword } k \text{ appears in the bi-gram or unigram})$$

Thus, if a keyword "Customer" appears in the unigram and bi-gram of six tables, and 12 tables exist in the relational schema, then the idf("Customer")=log(2)

The Tf–idf score of a keyword "k" with respect to table "t" is obtained as follows:

$$\text{Tf-idf}(k,t)=\text{Tf}(k,t)\times\text{idf}(k)$$

$$\text{Thus, Tf-idf}(\text{Customer},\text{Customer\_Table})=\text{Tf}(\text{Customer},\text{Customer\_Table})*\text{idf}(\text{Customer})=0.2*\log(2)$$

Once the probe set is constructed and the weight of each term in the probe set is determined, the document that is most similar to the relational schema (that is, the probe set) can be found. For this, each sentence of a document can be parsed and unigrams and bi-grams can be constructed from it. Once the sentence has been parsed, the intersection of the unigrams and bi-grams of the sentence with the probe set can be found. The unigrams and bi-grams that are common between these two sets constitute what is referred to herein as the common set. Also, a similarity score of each sentence from the common set of each sentence can be determined using the formula:

$$\text{Score} = \sum_{i \in Probe\_Set \cap Sentence\_tokens} tf_i \times idf_i$$

Sentences that have a weight greater than a small threshold are called candidate sentences. A threshold is required to avoid false positives due to unigram tokens. For example, a bi-gram Customer ADDRESS, which is not a column name but can be a sub-set in other column names such as, for example, Customer_ADDRESS_TYPE and Customer_AD-DRESS_LINE1 and CUSTOMER_ADDRESS_LINE2.

In order to find the part of a document that is most relevant to the schema, consider sentences that are adjacent to each other and have scores greater than the threshold. Heuristics such as considering sentences that are within five sentences of each other and have scores greater than the threshold to obtain the final schema segments can be used. Such merging of candidate sentences takes care of minor changes in the schema name as the design information is generally presented contiguously.

Also, the weight of an entire design document can be calculated as the sum of Tf–idf scores of all the distinct elements in the common set. The distinct elements in a candidate set can be considered as some set of bi-grams and unigrams can be repeated within the candidate set, and when computing the total score, these distinct elements must not be considered multiple times. Furthermore, the design document with the highest similarity for a given schema element denotes the latest design document (for example, D1).

When the document D1 is found that is most similar to the relational schema, the design document D2 that is most similar to D1 can also be found. This can involve constructing a new probe set using the latest design document D1. There can be multiple sets of sentences in document D1 that are related to the probe set. For example, within document D1, sentence numbers one through five can be related to the schema as well as sentence numbers 30-38 being related to the schema. In such a case, the set S1 of sentences (for example, 30-38) that has the highest score amongst all of the sets of sentences within document D1 that are related to the schema is determined. Then, those sets of sentences Si from the document that have a score greater than the threshold and have unigrams and/or bi-grams that are not common to the selected set S1 can be determined. The set S1 and the sentences Si form what is referred to herein as the context set. Constructing a new probe set may include, for example, constructing a context set.

The unigrams and bi-grams are formed from the new context to construct a new probe set. Term frequency of the terms in the probe set includes the number of times that the term appears in the schema segment constituting the context set. The idf of the terms in the probe set is calculated by determining the inverse of the number of paragraphs in which the term appears in the selected design document. The terms that did not belong to the original probe set are given lower weight as they are more likely to be descriptive words of the columns.

The new probe set can be used to find the document which has the highest similarity to the design document. This document appears next in the lineage of the schema. To find the next document in the lineage, the techniques described herein are repeated in a recursive manner.

Figure 2:
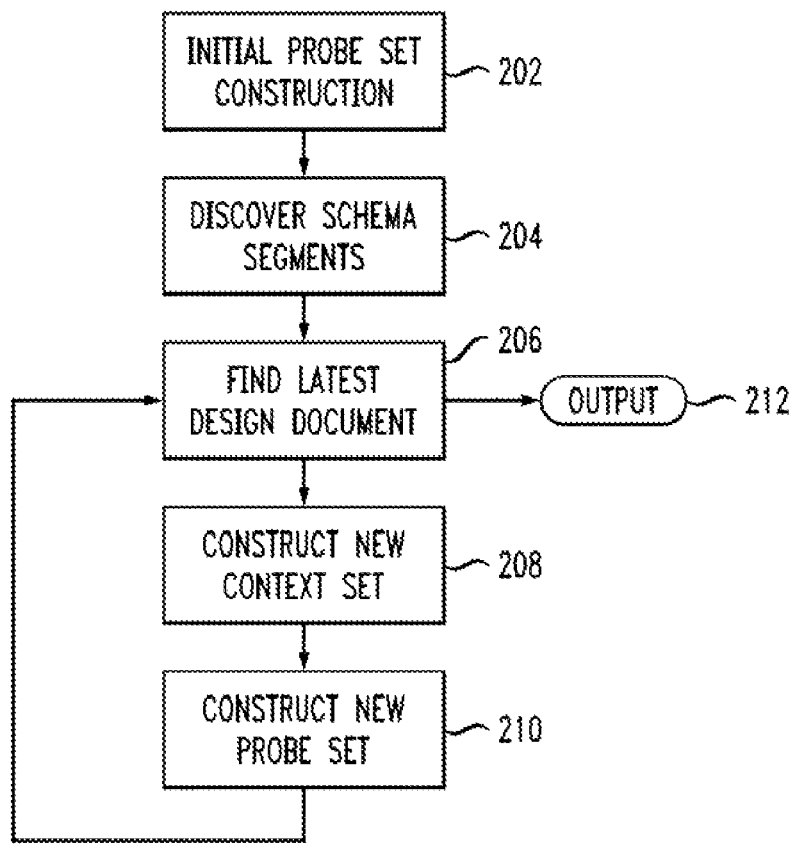
FIG. 2 is a flow diagram illustrating an exemplary technique for discovering design documents, according to an embodiment of the present invention.

FIG. 2 is a flow diagram illustrating an exemplary technique for discovering design documents, according to an embodiment of the present invention. By way of illustration, FIG. 2 depicts a progression that includes the following steps. Step 202 includes an initial probe set construction. Step 204 includes discovering schema segments. Step 206 includes finding the latest design documents. Step 208 includes constructing a new context set. Step 210 includes constructing a new probe set.

Also, as depicted in FIG. 2, the new probe set is used to find the document that is most similar to the new probe set via step 206. Once all of the documents have been exhausted, or when there are no additional documents similar to the schema, an output is provided at step 212.

Figure 3:
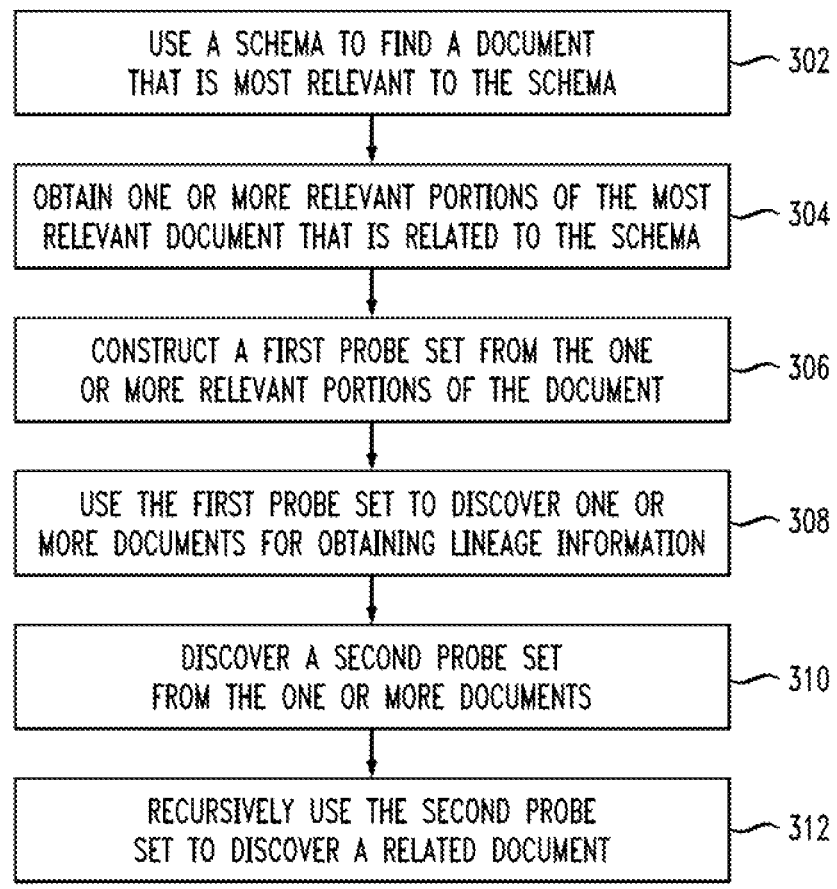
FIG. 3 is a flow diagram illustrating techniques for obtaining a lineage of a schema in one or more documents, according to an embodiment of the present invention.

FIG. 3 is a flow diagram illustrating techniques for obtaining a lineage of a schema in one or more documents, according to an embodiment of the present invention. The documents can include, for example, design documents. Step 302 includes using a schema to find a document that is most relevant to the schema. The schema can include, for example, relational schema, extensible markup language (XML) schema and/or object-oriented database schema.

Step 304 includes obtaining one or more relevant portions of the most relevant document that is related to the schema. Step 306 includes constructing a first probe set from the one or more relevant portions of the document. Step 308 includes using the first probe set to discover one or more documents for obtaining lineage information. Step 310 includes discovering a second probe set from the one or more documents.

Step 312 includes recursively using the second probe set to discover a related document. Recursively using the second probe set to discover a related document can include discovering a document that is most similar to the schema, and/or discovering a document that is most similar to the lineage.

The techniques depicted in FIG. 3 can also include, for example, obtaining a pictorial representation of an evolution of a schema of a table and/or a database. The pictorial representation can include information such as, for example, identification of an added column, when a column was added, when a column was removed, when a name of a column was changed and when a format was changed. Additionally, the techniques depicted in FIG. 3 can include enabling a user (for example, a data architect) to identify a specific design document and/or a specific portion of a specific design document where a particular column was first introduced.

The techniques illustrated in FIG. 3 can also include the steps of constructing an initial probe set from a schema and related information (such as, for example, an enterprise glossary), determining document sentences, groups of sentences and/or document similarity, merging candidate sentences, constructing a context set, and using the context set to construct a new probe set.

Constructing an initial probe set can include, for example, tokenizing a schema on one or more spaces and one or more special characters, and constructing bi-grams and/or unigrams, wherein the bi-grams and/or unigrams are constructed from schema element names and are added to the initial probe set. Determining document sentences, groups of sentences and/or document similarity can include determining a similarity score for each sentence. Merging candidate sentences can include merging candidate sentences that are near each other to obtain final schema segments.

Using the context set to construct a new probe set can include, for example, generating bi-grams and/or unigrams from the context set. Also, the techniques depicted in FIG. 3 can include using the new probe set to determine a document having a highest similarity to a document all documents in a system.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

Figure 4:
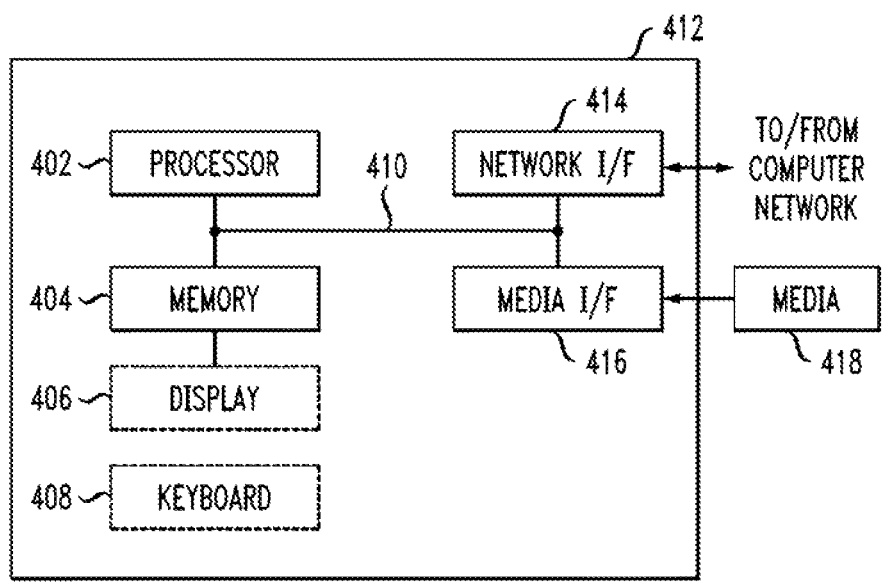
FIG. 4 is a system diagram of an exemplary computer system on which at least one embodiment of the present invention can be implemented.

The preferred implementation makes substantial use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any system for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 404), magnetic tape, a removable computer diskette (for example, media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, avoiding the problem of column name change due to the use of surrounding context information. One or more embodiments of the present invention may also provide the beneficial effect of using bi-grams and unigrams to determine various types of column name specifications. Also, due to recursive construction of probe set (as described herein), one or more embodiments of the invention can identify significant changes in a schema over a period of time.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a tangible computer useable readable recordable medium having computer useable program code for obtaining a lineage of a schema in one or more documents, said computer program product including:
    computer useable program code for using a schema to find a document that is most relevant to the schema;
    computer useable program code for obtaining one or more relevant portions of the most relevant document that is related to the schema;
    computer useable program code for constructing a first probe set from the one or more relevant portions of the document;
    computer useable program code for using the first probe set to discover one or more documents for obtaining lineage information;
    computer useable program code for discovering a second probe set from the one or more documents; and
    computer useable program code for recursively using the second probe set to discover a related document.

2. The computer program product of claim 1, wherein the one or more documents comprise one or more design documents.

3. The computer program product of claim 1, wherein the schema comprises relational schema.

4. The computer program product of claim 1, further comprising:
- computer useable program code for constructing an initial probe set from a schema and related information;
- computer useable program code for determining at least one of one or more document sentences, groups of sentences and document similarity;
- computer useable program code for merging one or more candidate sentences;
- computer useable program code for constructing a context set; and
- computer useable program code for using the context set to construct a new probe set.

5. A system for obtaining a lineage of a schema in one or more documents, comprising:
- a memory; and
- at least one processor coupled to said memory and operative to:
  - use a schema to find a document that is most relevant to the schema;
  - obtain one or more relevant portions of the most relevant document that is related to the schema;
  - construct a first probe set from the one or more relevant portions of the document;
  - use the first probe set to discover one or more documents for obtaining lineage information;
  - discover a second probe set from the one or more documents; and
  - recursively use the second probe set to discover a related document.

6. The system of claim 5, wherein the one or more documents comprise one or more design documents.

7. The system of claim 5, wherein the schema comprises relational schema.

8. The system of claim 6, wherein the at least one processor coupled to said memory is further operative to:
- construct an initial probe set from a schema and related information;
- determine at least one of one or more document sentences, groups of sentences and document similarity;
- merge one or more candidate sentences;
- construct a context set; and
- use the context set to construct a new probe set.

* * * * *